United States Patent [19]
Musukula et al.

[11] Patent Number: 5,921,605
[45] Date of Patent: *Jul. 13, 1999

[54] INTERLOCKING REAR SEAT AND PACKAGE TRAY ASSEMBLY

[75] Inventors: Vijay Musukula, Southfield; James Masters, Farmington Hills, both of Mich.

[73] Assignee: Lear Corporation, Southfield, Mich.

[*] Notice: This patent is subject to a terminal disclaimer.

[21] Appl. No.: 08/992,948

[22] Filed: Dec. 18, 1997

Related U.S. Application Data

[63] Continuation-in-part of application No. 08/705,512, Aug. 29, 1996, Pat. No. 5,813,715
[60] Provisional application No. 60/007,548, Nov. 27, 1995, and provisional application No. 60/016,775, May 7, 1996.

[51] Int. Cl.$^6$ ............................................. B60N 2/00
[52] U.S. Cl. ................................................ 296/63
[58] Field of Search .................................. 296/37.16, 63, 296/68.1, 136

[56] References Cited

U.S. PATENT DOCUMENTS

| | | |
|---|---|---|
| 3,446,526 | 5/1969 | Peters . |
| 3,632,157 | 1/1972 | Lehr . |
| 3,761,127 | 9/1973 | Giese et al. ............................ 296/68.1 |
| 3,799,577 | 3/1974 | Colucci . |
| 4,127,301 | 11/1978 | Syrowik . |
| 4,198,091 | 4/1980 | Appleton . |
| 4,443,034 | 4/1984 | Beggs .................................. 296/37.16 |
| 4,479,675 | 10/1984 | Zenkl .................................. 296/37.16 |
| 4,681,367 | 7/1987 | Timmers . |
| 4,799,729 | 1/1989 | Muscat .................................. 296/136 |
| 5,011,208 | 4/1991 | Lewallen .............................. 296/37.16 |
| 5,171,054 | 12/1992 | Wilson . |
| 5,286,084 | 2/1994 | Bart . |
| 5,288,122 | 2/1994 | Pilhall ................................. 296/37.16 |
| 5,358,307 | 10/1994 | Shafer et al. . |
| 5,366,270 | 11/1994 | Heussner et al. . |
| 5,492,361 | 2/1996 | Kim . |
| 5,647,611 | 7/1997 | Boyd et al. ............................ 296/68.1 |

Primary Examiner—Stephen Avila
Attorney, Agent, or Firm—MacMillan, Sobanski & Todd, LLC

[57] ABSTRACT

An automotive rear seat assembly having a seat back with a top and a bottom for supporting the back of an occupant. A package tray extends from the top of the seat back to an outer periphery. The package tray has a first appendage and a second appendage. A rotational connection is disposed between the package tray and the top of the seat back which pivotally interconnects the first appendage of the package tray to the seat back. The rear seat assembly may be shipped in a first position with the package tray overlying the seat back and installed in a vehicle in a second position by rotating the package tray relative to the seat back to a position transverse to the seat back. The top of the seat back has a C-shaped receptacle and the second appendage of the package tray has a projecting tab. The projecting tab engages the receptacle to mechanically interlock the package tray to the top of the seat back when the package tray is in the second position transverse to the seat back.

21 Claims, 12 Drawing Sheets

INTERLOCKING REAR SEAT AND PACKAGE TRAY ASSEMBLY

RELATED APPLICATION

This application is a Continuation-In-Part of application Ser. No. 08/705,512, filed on Aug. 29, 1996, now U.S. Pat. No. 5,813,715 issued Sep. 24,1998, which in turn claims the benefits of U.S. Provisional Patent Application No. 60/007,548, filed on Nov. 27, 1995, and U.S. Provisional Patent Application No. 60/016,775, filed on May 7, 1996.

TECHNICAL FIELD

The subject invention relates to automotive seat assemblies and, more specifically, to a package tray pivotally attached to a rear seat assembly.

BACKGROUND OF THE INVENTION

By way of background, rear seat assemblies typically include a seat bottom and a seat back. The seat back comprises a right and a left seating surface and a center portion positioned between the right and left seating surfaces. The right and left seating surfaces and the center portion of the seat back is usually one unitary piece, i.e., they form a bench-type seat back. The right and left seating surfaces are conformed into numerous shapes, sizes, or configurations depending upon the vehicle model. An armrest may be pivotally disposed within the center portion for selective use by an occupant. Further, stationary or adjustable headrests may be located at the top surface of the seat back. A number of mounting brackets extend downwardly from the seat back for mounting engagement with a vehicle floor pan. These brackets may comprise a pivot hinge which allows the seat back to pivot forwardly toward the seat bottom. This may be desirable if a user wishes to extend the floor of a rear trunk compartment.

Similarly, the seat bottom comprises a right and left seating surface and a center portion positioned between the right and left seating surfaces. The right and left seating surfaces and the center portion of the seat bottom is also one unitary piece. The right and left seating surfaces may also be contoured into any number of shapes, sizes, or configurations. A number of mounting brackets extend from the seat bottom portion for mounting engagement with the seat back and/or the vehicle floor pan.

A package tray, having a curved rear periphery and a substantially flat front face, is typically mounted to the vehicle behind the rear seat assembly. The package tray usually retains numerous devices such as audio speakers, audio headphone jacks, first aid kits, rear tail lights, seat belt mounting plates, and seat belt retractors. The package tray may also be covered by a trim cover material.

The rear periphery of the package tray is mounted below a rear window at the juncture of the rear window and the rear trunk compartment, whereby the package tray covers the opening between the rear of the seat back and the trunk compartment. The package tray mounts to the juncture by means of numerous attachment devices. The tray usually includes a number of brackets or mounting holes located within the flat front face. During installation, the package tray is mounted to the vehicle and the necessary devices are then installed in the tray. Some time after the tray is mounted, the separate components of the rear seat assembly are installed within the vehicle. The seat back typically latches to the brackets extending from the package tray or is bolted via the mounting holes to the package tray. Accordingly, the current manufacturing procedure requires at least two (2) separate and distinct steps for mounting the package tray and the seat back within the vehicle.

SUMMARY OF THE INVENTION AND ADVANTAGES

An automotive rear seat assembly comprising a seat back having a top and a bottom for supporting the back of an occupant. A package tray extends from the top of the seat back to an outer periphery. The package tray has a first appendage and a second appendage. A rotational connection rotatably interconnects the first appendage of the package tray with the top of the seat back. The package tray may be rotated relative to the seat back from a first position substantially overlying the seat back to a second position transverse to the seat back. The top of the seat back has at least one receptacle and the second appendage of the package tray has at least one projecting tab. The projecting tab engages the receptacle to mechanically interlock the package tray to the top of the seat back when the package tray is in the second position.

Accordingly, the subject invention provides for a package tray pivotally connected to the seat back wherein the package tray is locked into a second position transverse to the seat back. The package tray then becomes a structural component of the seat back and links the top of the seat back to the interior of a vehicle. Due to this additional structural support, the seat belt retractors and other load bearing devices can be mounted directly to the package tray.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figures 1, 2, 3:
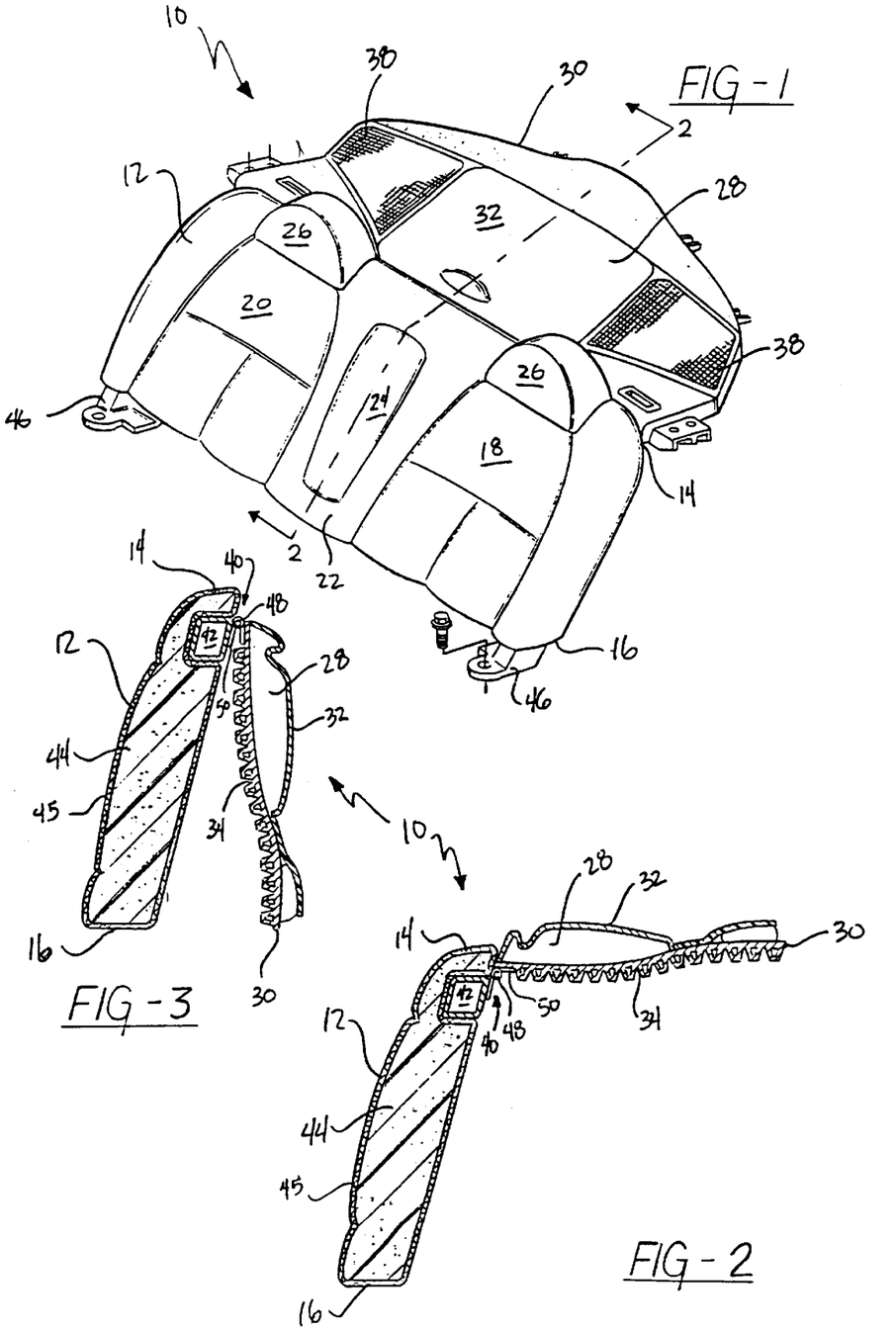
FIG. 1 is a perspective view of a rear seat assembly according to the subject invention.
FIG. 2 is a cross-sectional view taken along line 2—2 of FIG. 1.
FIG. 3 is a view similar to FIG. 2 but showing a package tray pivoting toward a seat back in a partially overlying position.

Referring to the Figures, wherein like numerals indicate like or corresponding parts throughout the several views, an automotive rear seat assembly is generally shown at 10. The rear seat assembly 10 comprises a bench-type seat back 12 having a top 14 and a bottom 16 for supporting the back of an occupant (not shown) and a bench-type seat bottom (not shown) for supporting the bottom of the occupant. Specifically, the seat back 12 comprises a right 18 and a left 20 seating surface and a center portion 22 positioned between the right 18 and left 20 seating surfaces. The right 18 and left 20 seating surfaces and the center portion 22 of the seat back 12 are one unitary piece. The right 18 and left 20 seating surfaces may be contoured into any number of shapes, sizes, or configurations to accommodate various vehicle models. An armrest 24 is pivotally disposed within the center portion 22 of the seat back 12 for selective use by the occupant. Further, stationary or adjustable headrests 26 are located at the top 14 of the seat back 12 for use by the occupant. In addition, other accessories may be added to the rear seat assembly 10, i.e., an integral child seat (not shown), a pair of side impact air bags (not shown), integral storage compartments (not shown), etc.

Figure 4:
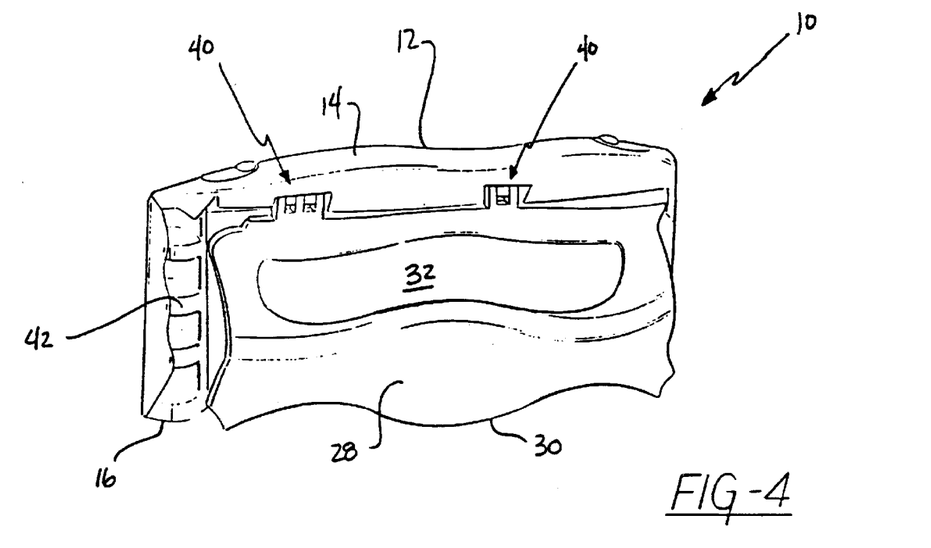
FIG. 4 is a perspective view of the subject invention in a shipping condition.

A package tray 28 extends from the top 14 of the seat back 12 to an outer periphery 30. The package tray 28 has a top surface 32 and a bottom surface 34. A fabric cover may extend over the top surface 32 of the tray 28 to improve the aesthetics of the tray 28. In addition, the top surface 32 may house a rear tail light 36, a number of speaker grills 38, a first aid kit (not shown), or any other appropriate device. A rotational connection, generally depicted at 40, is located between the tray 28 and the top 14 of the seat back 12. As shown in FIGS. 2, 3, and 4, the rear seat assembly 10 may be shipped with the tray 28 substantially overlying the seat back 12 (FIG. 4) and installed in a vehicle (not shown) by rotating the tray 28 relative to the seat back 12 to a position transverse to the seat back 12 (FIG. 2). In other words, during installation of the rear seat assembly 10 into the vehicle, the seat back 12, package tray 28, and all other seat back accessories included in the rear seat assembly 10 are installed as a unitary piece.

The seat back 12 includes a back frame 42 and cushioning material 44 supported by the back frame 42. The cushioning material 44 may be covered by a fabric and/or leather trim cover 45. The rotational connection 40 interconnects the back frame 42 and the tray 28. A number of mounting brackets 46 extend downwardly from the back frame 42 for mounting engagement with a vehicle floor pan (not shown).

One embodiment of the rotational connection 40 is shown in FIGS. 2 and 3 wherein the rotational connection 40 comprises a piano hinge 48 pivotally connected between the back frame 42 and the tray 28. The piano hinge 48 comprises two flat plates 50 each having cylindrical sections located at a distal end thereof. The cylindrical sections are intermeshed with each other with a pin extending therethrough, whereby the two plates 50 are pivotally interconnected. The piano hinge 48 may extend along the entire top 14 of the seat back 12 or any section thereof so long as the hinge 48 provides adequate support for the tray 28.

Figures 5, 6:
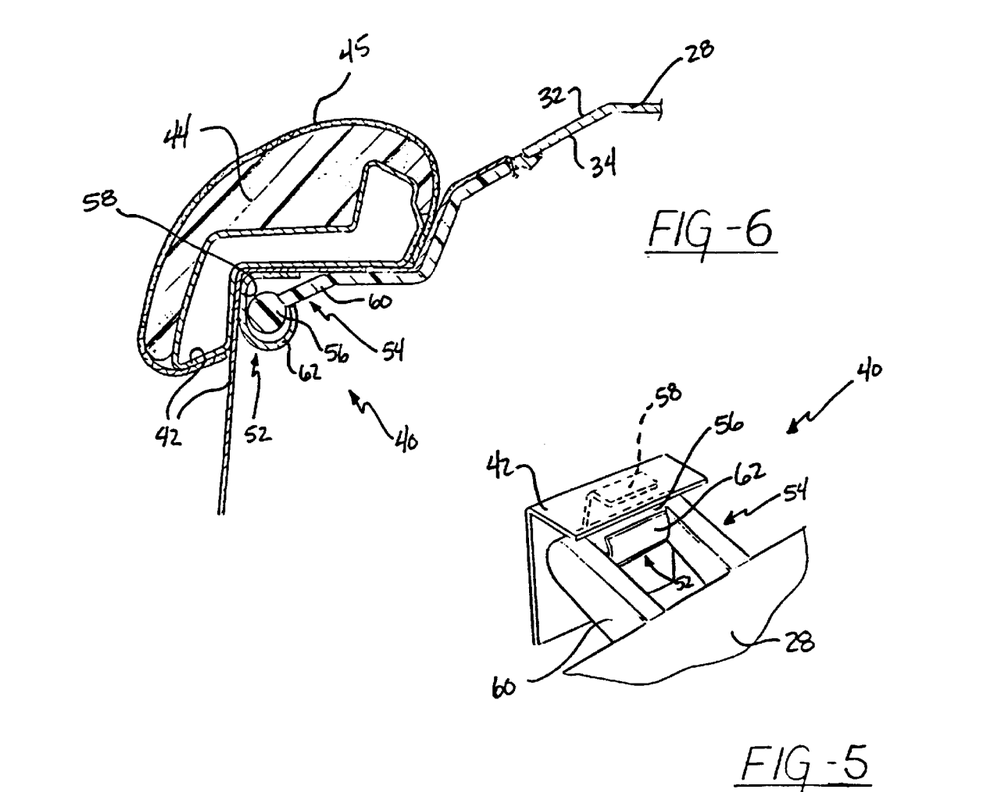
FIG. 5 is an enlarged perspective view of a rotational connection between the seat back and package tray.
FIG. 6 is a cross-sectional view of the rotational connection of FIG. 5.

Another embodiment of the rotational connection 40 is shown in FIGS. 5 and 6 wherein the rotational connection 40 comprises a pocket, generally depicted at 52, and a bulbous projection, generally depicted at 54. The bulbous projection 54 comprises a cylindrical section 56 and the pocket 52 comprises a clip 58 wherein the cylindrical section 56 is disposed in the clip 58. A pair of support legs 60 extends from the tray 28 and supports the cylindrical section 56 therebetween. The clip 58 includes an inwardly curved hook 62 and is fixedly secured to the back frame 42. More specifically, the cylindrical section 56 extends from the tray 28 and is disposed within the curved hook 62 protruding from the back frame 42, whereby the tray 28 is pivotally secured to the back frame 42. As shown in FIG. 6, the support legs 60 are angled downwardly from the tray 28 to ensure constant engagement with the curved hook 62 when the tray 28 is rotated transverse to the seat back 12. As can be appreciated, the support legs 60 and the cylindrical section 56 could extend from the back frame 42 with the clip 58 secured to the tray 28 without deviating from the scope of the subject invention.

Figures 7, 8, 9, 10, 11:
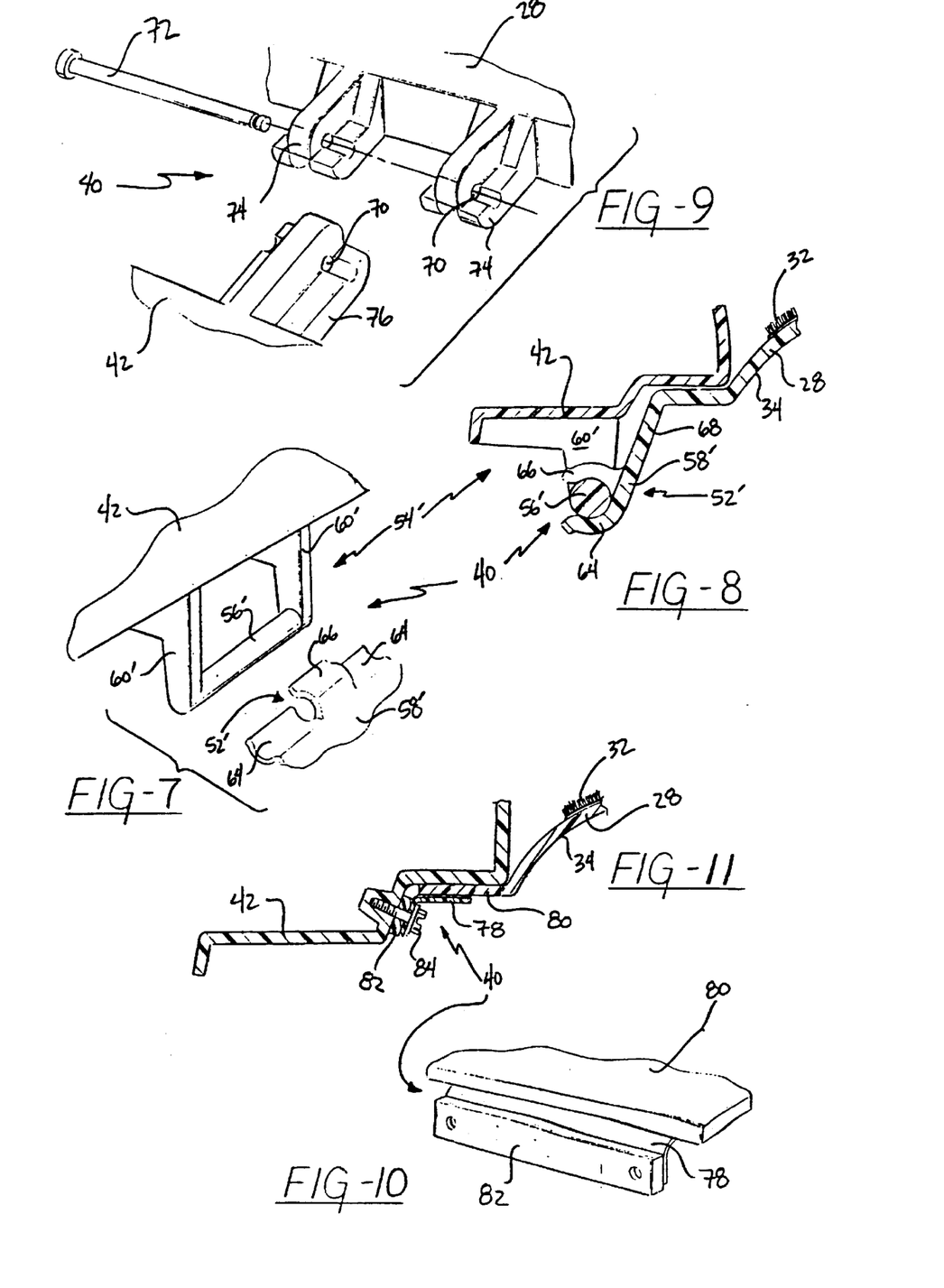
FIG. 7 is an enlarged perspective view of an alternative embodiment of the rotational connection.
FIG. 8 is a cross-sectional view of the rotational connection of FIG. 7.
FIG. 9 is an enlarged perspective view of another alternative embodiment of the rotational connection.
FIG. 10 is an enlarged perspective view of yet another alternative embodiment of the rotational connection.
FIG. 11 is a cross-sectional view of the rotational connection of FIG. 10.

An alternative embodiment of the rotational connection 40 is shown in FIGS. 7 and 8 which is similar to the rotational connection 40 of FIGS. 5 and 6 wherein like numerals having a prime indicate like or corresponding parts. The rotational connection 40 comprises a pocket 52' and a bulbous projection 54' rotatably disposed in the pocket 52'. The bulbous projection 54 comprises a cylindrical section 56' and the pocket 52' comprises a clip 58'. A pair of support legs 60' extends from the back frame 42 and support the cylindrical section 56' therebetween. The clip 58' comprises at least two jaws 64, 66 which retain the cylindrical section 56' therein. More specifically, the cylindrical section 56' extends downwardly from the back frame 42 and is disposed within three jaws 64, 66 protruding from the tray 28, whereby the tray 28 is pivotally secured to the back frame 42. As shown in FIG. 7, the three jaws 64, 66 are configured with two upwardly curved outside jaws 64 and one downwardly curved center jaw 66. The jaws 64, 66 could be configured in any manner so long as they adequately retain the cylindrical section 56' therein. A downwardly angled support plate 68 interconnects the jaws 64, 66 to the tray 28. As can be appreciated, the support legs 60' and the cylindrical section 56' could extend from the tray 28 with the clip 58' secured to the back frame 42 without deviating from the scope of the subject invention.

Yet another embodiment of the rotational connection 40 is shown in FIG. 9 wherein the rotational connection 40 comprises a plurality of overlapping legs 74, 76 each having a bore 70 extending therethrough. A pin 72 passes through the bores 70 which interconnects the legs 74, 76 to form a hinge whereby the legs 74, 76 rotate about the pin 72. As depicted in FIG. 9, two outside legs 74 extend from the tray 28 and one center leg 76 extends from the back frame 42. The center leg 76 fits within the two outside legs 74 such that the bores 70 are aligned with each other. As is apparent to those skilled in the art, there may be any number of legs 74, 76 extending from the tray 28 or the back frame 42 so long as a hinge can be formed.

An additional embodiment of the rotational connection 40 is shown in FIGS. 10 and 11 wherein the rotational connection 40 comprises a material 78 affixed at one end to the tray 28 and at the other end to the back frame 42. Specifically, the material 78 is adhered to a flange 80 extending from the tray 28 at one end and adhered to an attachment bracket 82 at the other end. The attachment bracket 82 in turn is mounted to the back frame 42 via a screw 84. The material 78 may be made of any flexible material such as woven cloth, rubber, or the like so long as the material 78 can bend to provide a pivotal connection between the tray 28 and the seat back 42.

Figure 12:
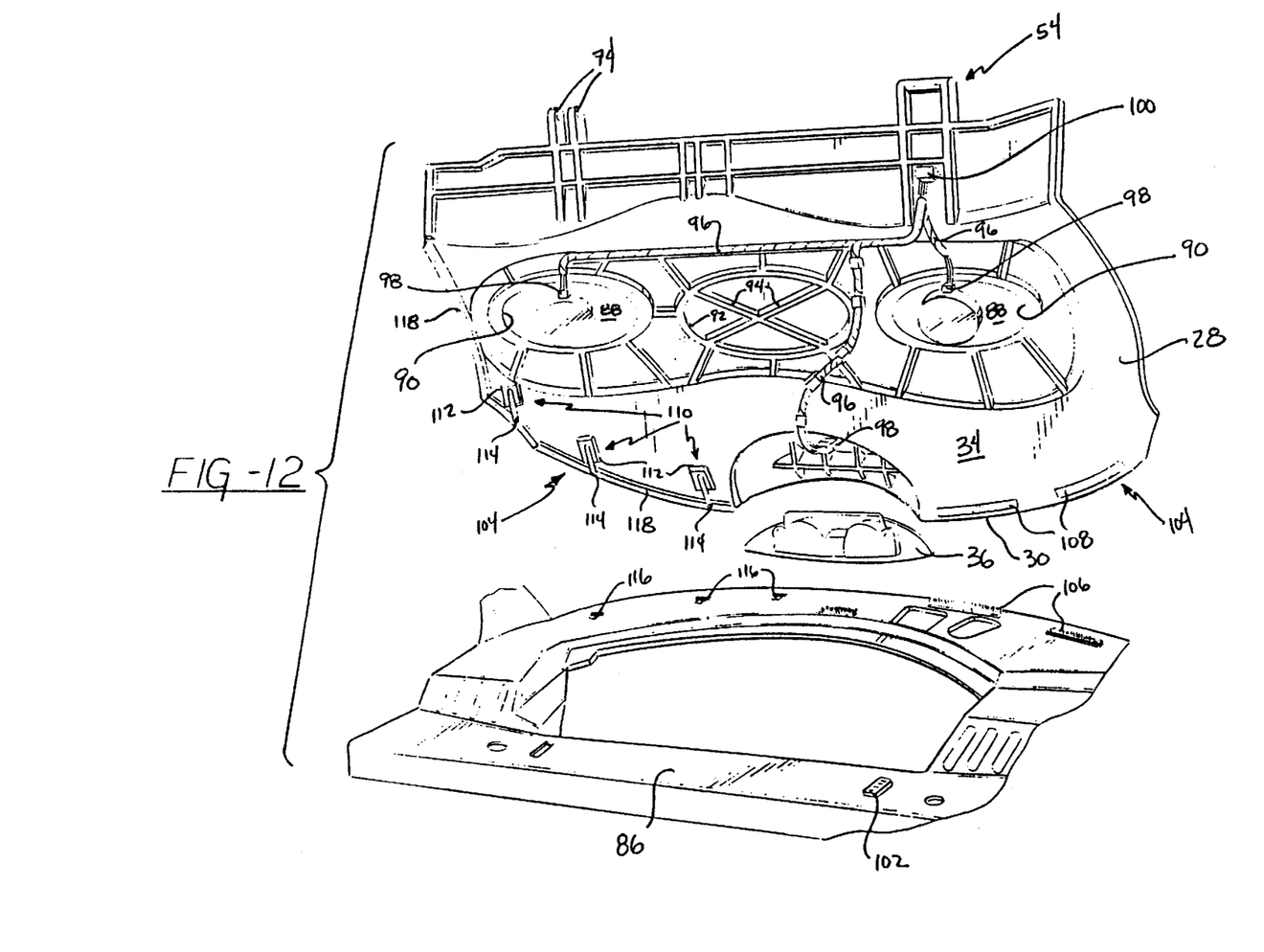
FIG. 12 is a fragmentary perspective view of the underside of the package tray of FIG. 1 and a vehicle frame.

The bottom surface 34 of the package tray 28 is shown in greater detail in FIG. 12. Also shown in FIG. 12 is a fragmentary view of a vehicle frame 86. The tray 28 defines a number of open cavities 90, 92 which can house audio speakers of various sizes or other appropriate devices. Specifically shown in FIG. 12 are two 6×9 audio speakers 88 housed in a pair of outside cavities 90 wherein a center cavity 92 has support beams 94 extending therethrough. Each audio speaker 88 includes electrical leads 96 with connectors 98 for connection to a first box 100 of a wiring harness located on the tray 28. A second or corresponding box 102 is located on the vehicle frame 86 for engagement with the first box 100 when the tray 28 is installed. The rear tail light 36 is also supported by the tray 28 and includes electrical leads 96 with connectors 98 for connection to the first box 100 of the wiring harness on the tray 28. The bulbous projection 54 shown in FIGS. 5 and 6 and the legs 74 shown in FIG. 9 are shown attached to the tray 28 as purely representative of the rotational connection 40. As can be appreciated any number of the rotational connections 40 disclosed could be affixed to the tray 28. Further, the package tray 28 may be shaped in any manner and house any number of devices without deviating from the scope of the subject invention.

Attachment members, generally depicted at 104, are located along the outer periphery 30 of the tray 28 for attachment to the vehicle frame 86. Two embodiments of the attachment members 104 are shown in FIG. 12. The first embodiment is a plurality of hook and loop fasteners 106, 108 located along the outer periphery 30 of the tray 28. The hook and loop fasteners 106, 108 comprise a hook section 106 and a loop section 108 which are glued, adhered, or otherwise affixed to the tray 28 and to the vehicle frame 86. Either the hook section 106 or the loop section 108 may be affixed to the tray 28 wherein the corresponding hook section 106 or loop section 108 is affixed to the vehicle frame 86. The second embodiment is a plurality of outwardly projecting fingers generally depicted at 110.

Figures 13, 14:
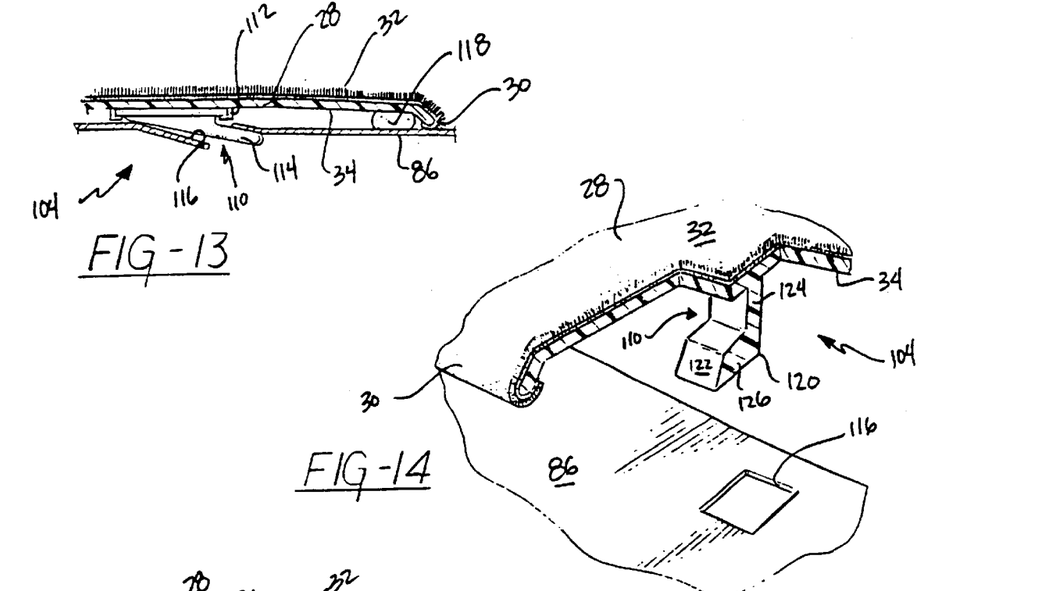
FIG. 13 is a cross-sectional view of an attachment device between the package tray and the vehicle frame of FIG. 12.
FIG. 14 is a fragmentary perspective view of an alternative embodiment of the attachment device.

A cross-sectional view of the outwardly projecting fingers 110 is also shown in FIG. 13. An attachment plate 112 is locked within the tray 28 whereby the fingers 110 extend from the attachment plate 112. Specifically, the fingers 110 are round retainer pegs 114 that extend downwardly and outwardly in a substantially acute angle from the tray 28. The retainer pegs 114 engage a corresponding aperture 116 located within the vehicle frame 86 when the tray 28 is installed in the vehicle (FIG. 13). A foam strip 118 is mounted along the outer periphery 30 of the tray 28 outside the distal end of the retainer pegs 114 which provides additional support for the outer periphery 30 of the tray 28.

Figures 15, 16, 17:
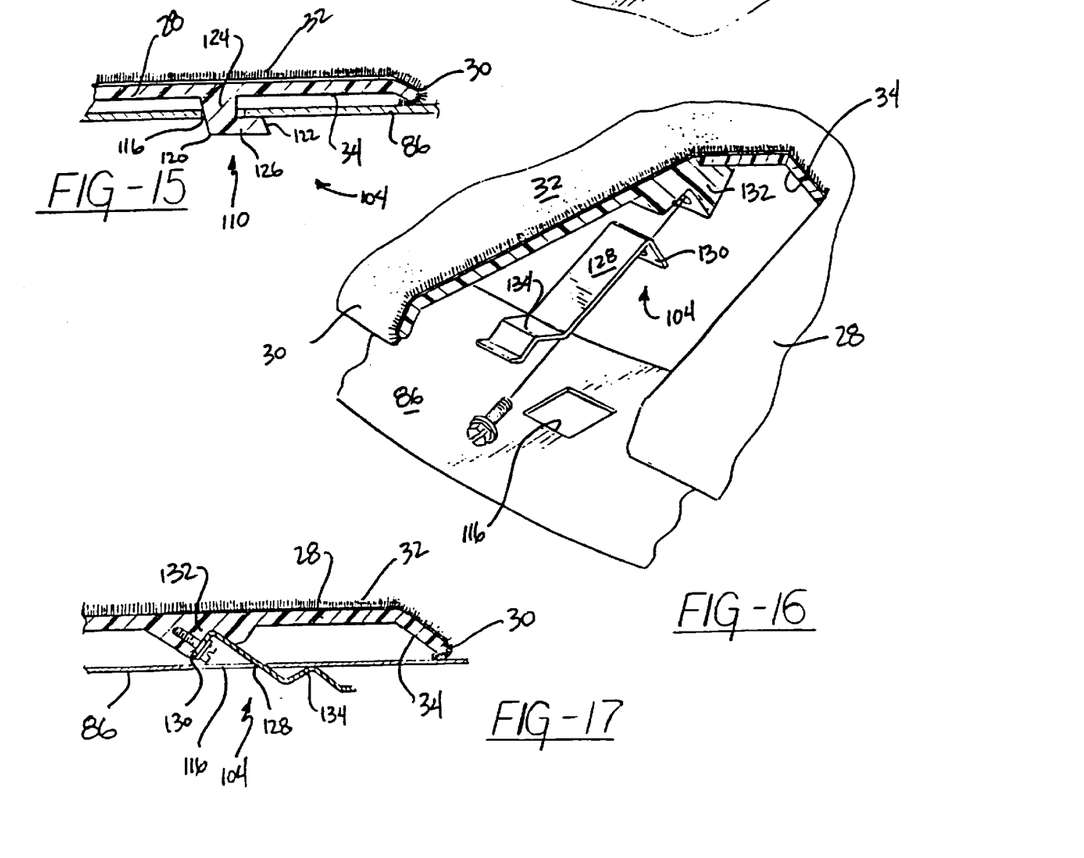
FIG. 15 is a cross-sectional view of the attachment device of FIG. 14.
FIG. 16 is a fragmentary perspective view of another alternative embodiment of the attachment device.
FIG. 17 is a cross-sectional view of the attachment device of FIG. 16.

An alternative embodiment of the outwardly projecting fingers 110 is shown in FIGS. 14 and 15 which is similar to the outwardly projecting fingers 110 of FIGS. 12 and 13. The outwardly projecting fingers 110 comprise a number of L-shaped fingers 120 that include sloping front surfaces 122. Specifically, the L-shaped fingers 120 have a long leg 124 extending downwardly and substantially perpendicular from the tray 28. A short leg 126 extends outwardly from the long leg 124 in a substantially parallel direction to the tray 28. The L-shaped fingers 120 engage the corresponding aperture 116 located within the vehicle frame 86 when the tray 28 is installed in the vehicle (FIG. 15).

Yet another embodiment of the attachment members 104 is shown in FIGS. 16 and 17 wherein the attachment members 104 comprise a plurality of cantilevered hooks 128 affixed to the tray 28. Each cantilevered hook 128 has a first end 130 which is bent to cooperate with an abutment 132 in the tray 28. Specifically, the first end 130 is bolted or otherwise attached to the abutment 132. Each cantilevered hook 128 also includes an upwardly bent second end 134, whereby the upwardly bent second ends 134 extend through the corresponding aperture 116 in the vehicle frame 86 when the tray 28 is installed in the vehicle (FIG. 17). These upwardly bent second ends 134 engage the inside surface of the vehicle frame 86 which prevents any upward movement of the tray 28.

Figures 18, 19, 20, 21:
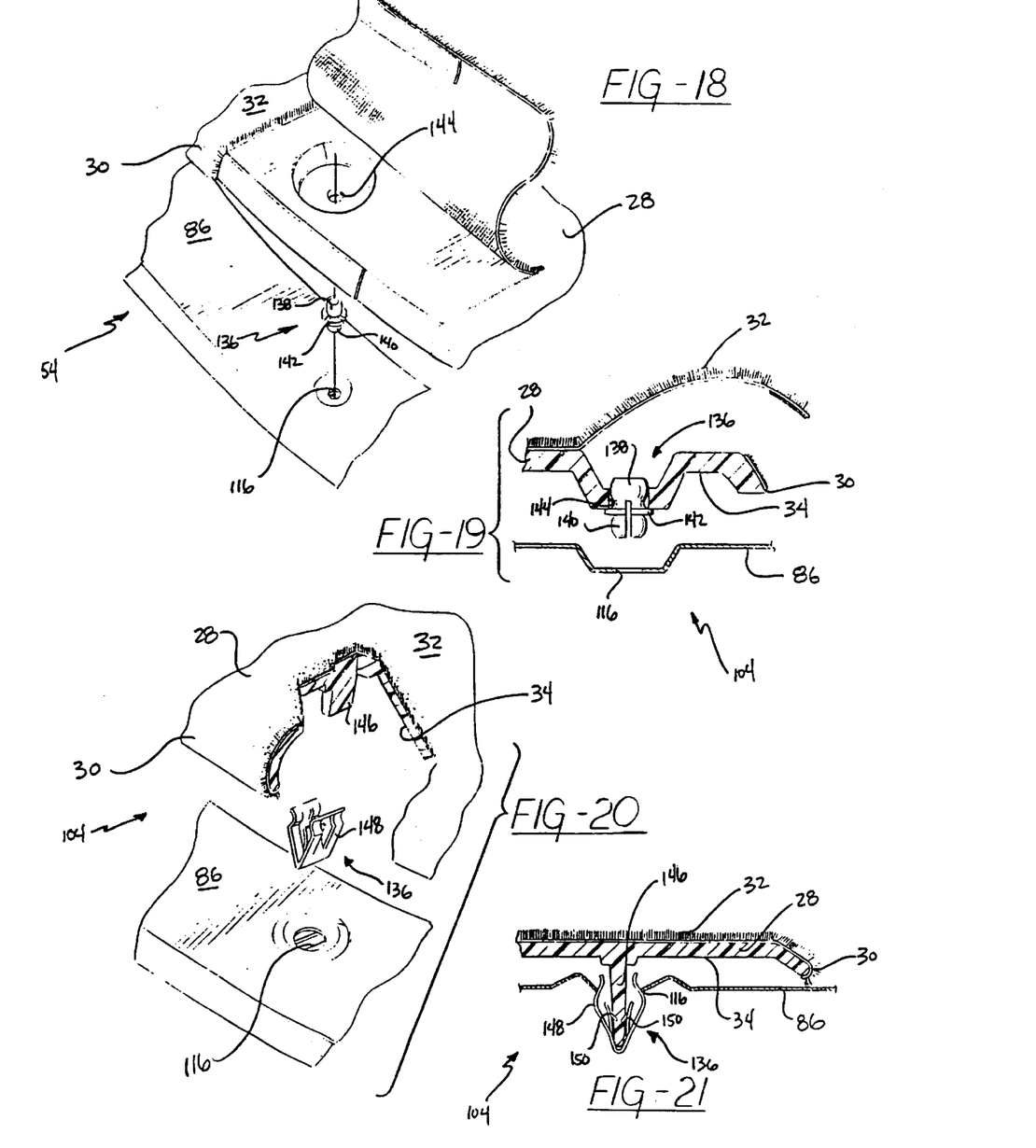
FIG. 18 is a fragmentary perspective view of yet another alternative embodiment of the attachment device.
FIG. 19 is a cross-sectional view of the attachment device of FIG. 18.
FIG. 20 is a fragmentary perspective view of yet another alternative embodiment of the attachment device.
FIG. 21 is a cross-sectional view of the attachment device of FIG. 20.

Another embodiment of the attachment members 104 is shown in FIGS. 18 and 19 wherein the attachment members 104 comprise a plurality of snap-in fasteners which are generally depicted at 136. The snap-in fasteners 136 each have a top bead 138 and a bottom bead 140 with a circular ridge 142 separating the two beads 138, 140. The bottom bead 140 is split into at least two sides whereby the sides can move with resect to each other. The top bead 138 of the snap-in fasteners 136 engages an aperture 144 located within the tray 28. Specifically, the top bead 138 extends partially through the aperture 144 and the ridge 142 abuts the bottom surface 34 of the tray 28. The bottom bead 140 of the snap-in fasteners 136 engages the corresponding apertures 116 in the vehicle frame 86 when the tray 28 is installed in the vehicle.

An alternative embodiment of the snap-in fasteners 136 is shown in FIGS. 20 and 21 which is similar to the snap-in fasteners 136 of FIGS. 18 and 19. A downwardly projecting flange 146 extends from the tray 28 wherein the snap-in fasteners 136 have V-shaped sides 148 and engage the downwardly projecting flange 146. Specifically, a pair of interior clasps 150 engages the flange 146 and retains the V-shaped snap-in fastener 136 in position. The V-shaped snap-in fasteners 136 also engage the corresponding apertures 116 in the vehicle frame 86 when the tray 28 is installed in the vehicle (FIG. 21).

Alternatively, referring to FIGS. 22 through 27, another embodiment of the automotive rear seat assembly is generally shown at 200. The rear seat assembly 200 comprises a bench-type seat back 202 having a top 204 and a bottom 206 for supporting the back of an occupant (not shown).

Figure 22:
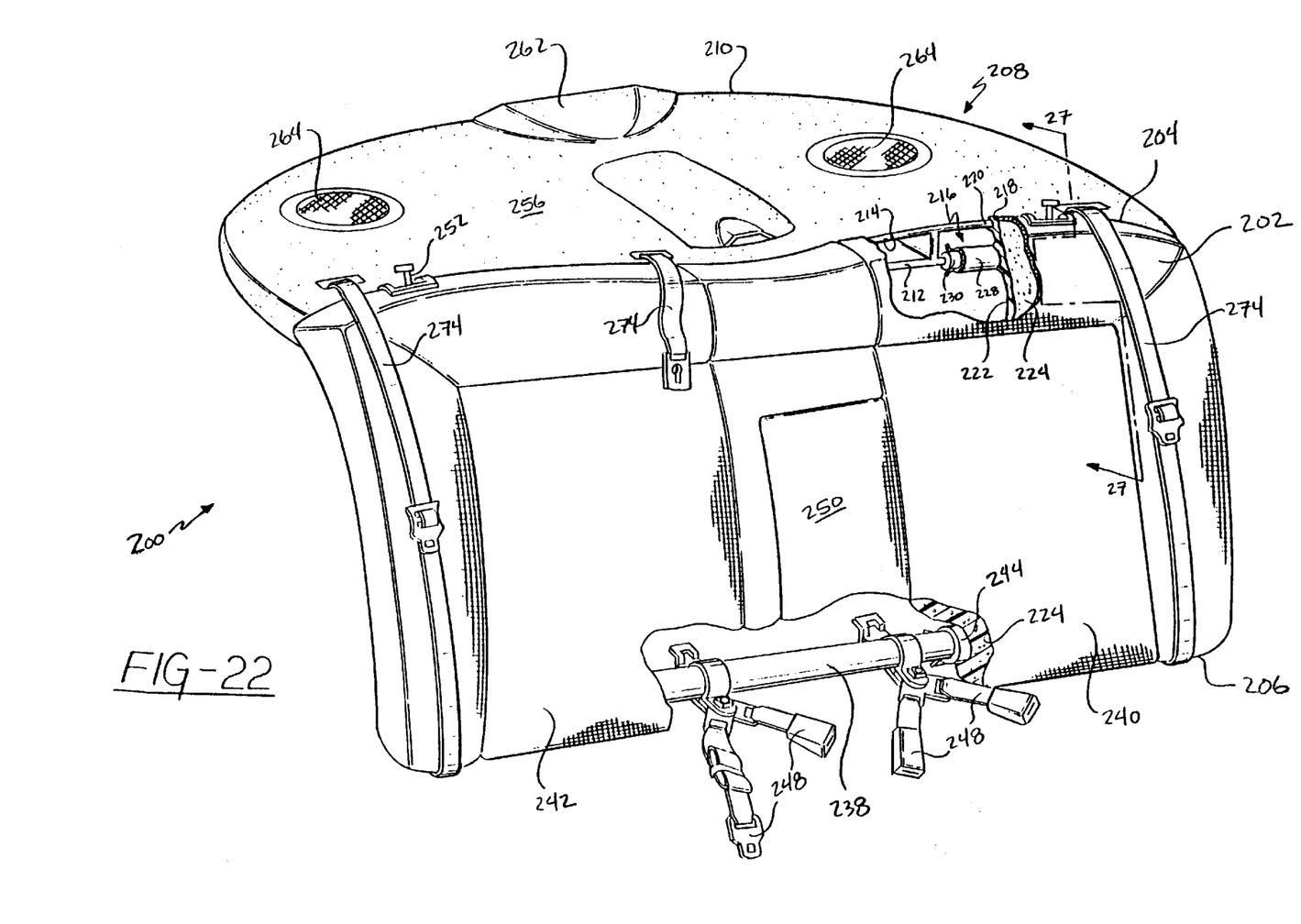
FIG. 22 is a perspective view of an additional embodiment of the rear seat assembly incorporating an additional embodiment of the subject invention.

A package tray, generally shown at 208, extends from the top 204 of the seat back 202 to an outer periphery 210. The package tray 208 has a first appendage 212 and a second appendage 214. A rotational connection, generally shown at 216, rotatably interconnects the first appendage 212 of the package tray 208 with the top 204 of the seat back 202. Referring back to FIGS. 2 and 3, the package tray 208 may be rotated relative to the seat back 202 from a first position substantially overlying the seat back 202 to a second position transverse to the seat back 202. During installation of the rear seat assembly 200 into a vehicle, the seat back 202, package tray 208, and all other seat back accessories included in the rear seat assembly 200 are installed as a unitary piece.

Figure 27:
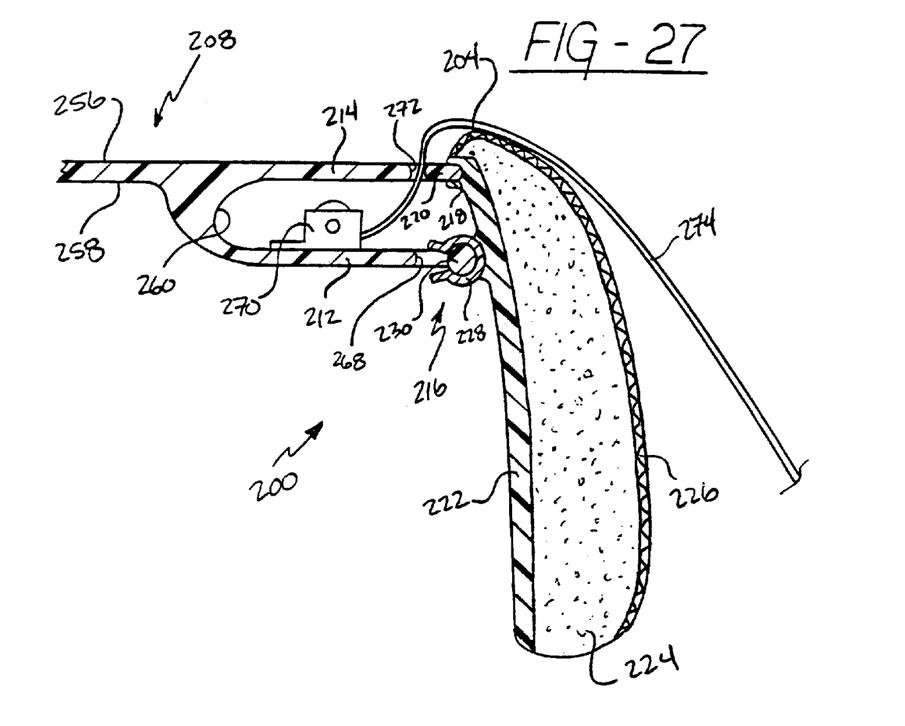
FIG. 27 is a cross-sectional view taken along lines 27—27 of FIG. 22.

The top 204 of the seat back 202 has at least one receptacle 218 and the second appendage 214 of the package tray 208 has at least one projecting tab 220. As shown in FIGS. 22 and 27 the projecting tab 220 engages the receptacle 218 to mechanically interlock the package tray 208 to the top 204 of the seat back 202 when the package tray 208 is in the second position. Hence, the package tray 208 is locked in this position transverse to the seat back 202. The package tray 208 becomes a structural component of the seat back 202 and links the top 204 of the seat back 202 to the interior of the vehicle. In the preferred embodiment, the receptacle 218 is a C-shaped recess within the seat back 202 and the tab 220 is a flat projection having a rounded leading edge. The tab 220 is retained within the receptacle 218 by the frictional forces created between the tab 220 and receptacle 218. In the preferred embodiment, the tab 220 extends along the majority of the second appendage 214 of the package tray 208. Likewise, the receptacle 218 extends along a corresponding section of the seat back 202. This design is very simple, effective and inexpensive. The receptacle 218 and the tab 220 may, however, be of any suitable design so long as the package tray 208 can be adequately retained within a portion of the seat back 202. Further, the tab 220 and receptacle 218 may extend along only a portion of the tray 208 and seat back 202 without deviating from the scope of the subject invention. In other words, the novel features of this invention are not limited to the specific embodiment shown.

Figure 25:
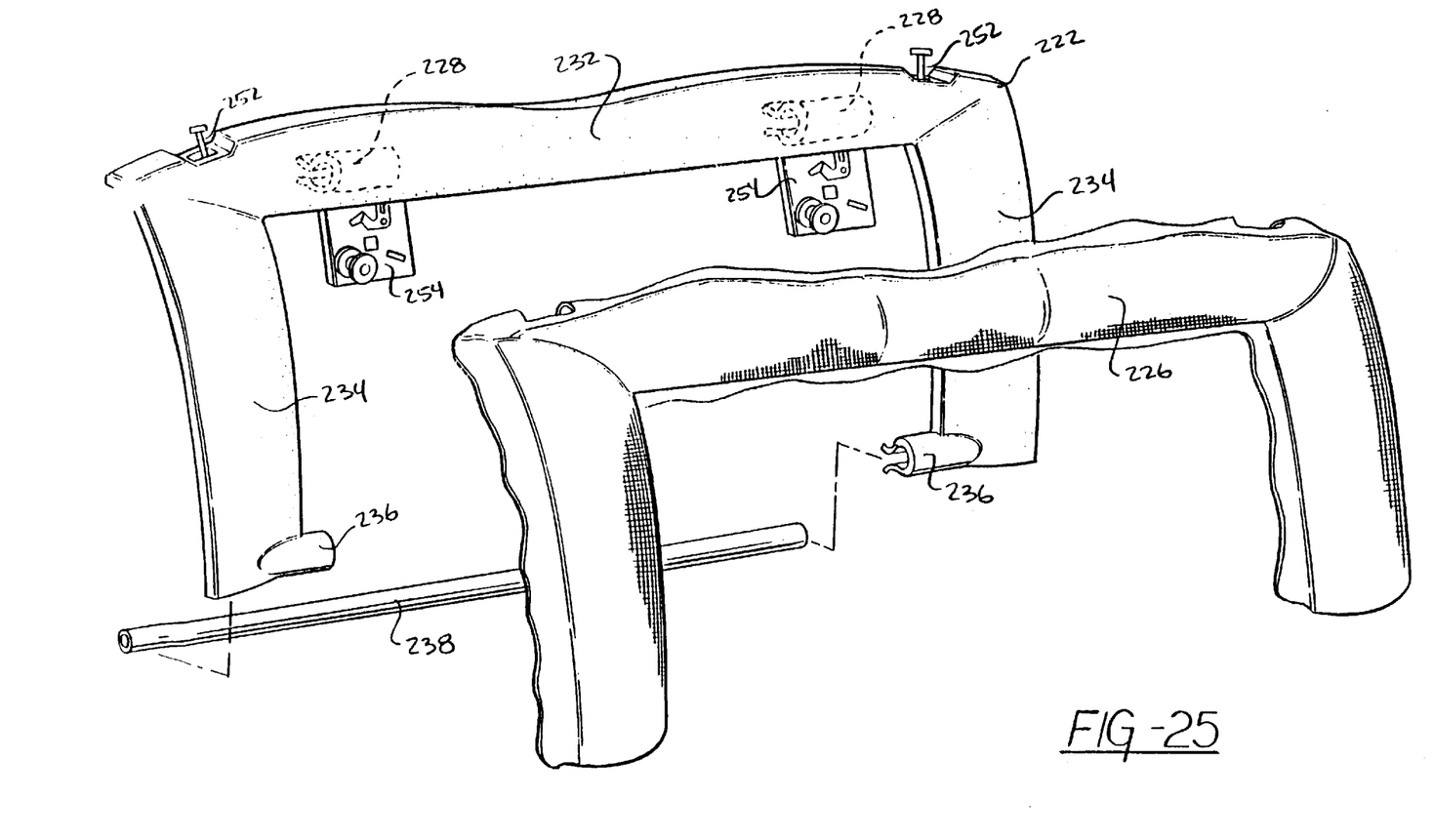
FIG. 25 is a perspective view of a disassembled seat back as shown in FIG. 22.
Figure 26:
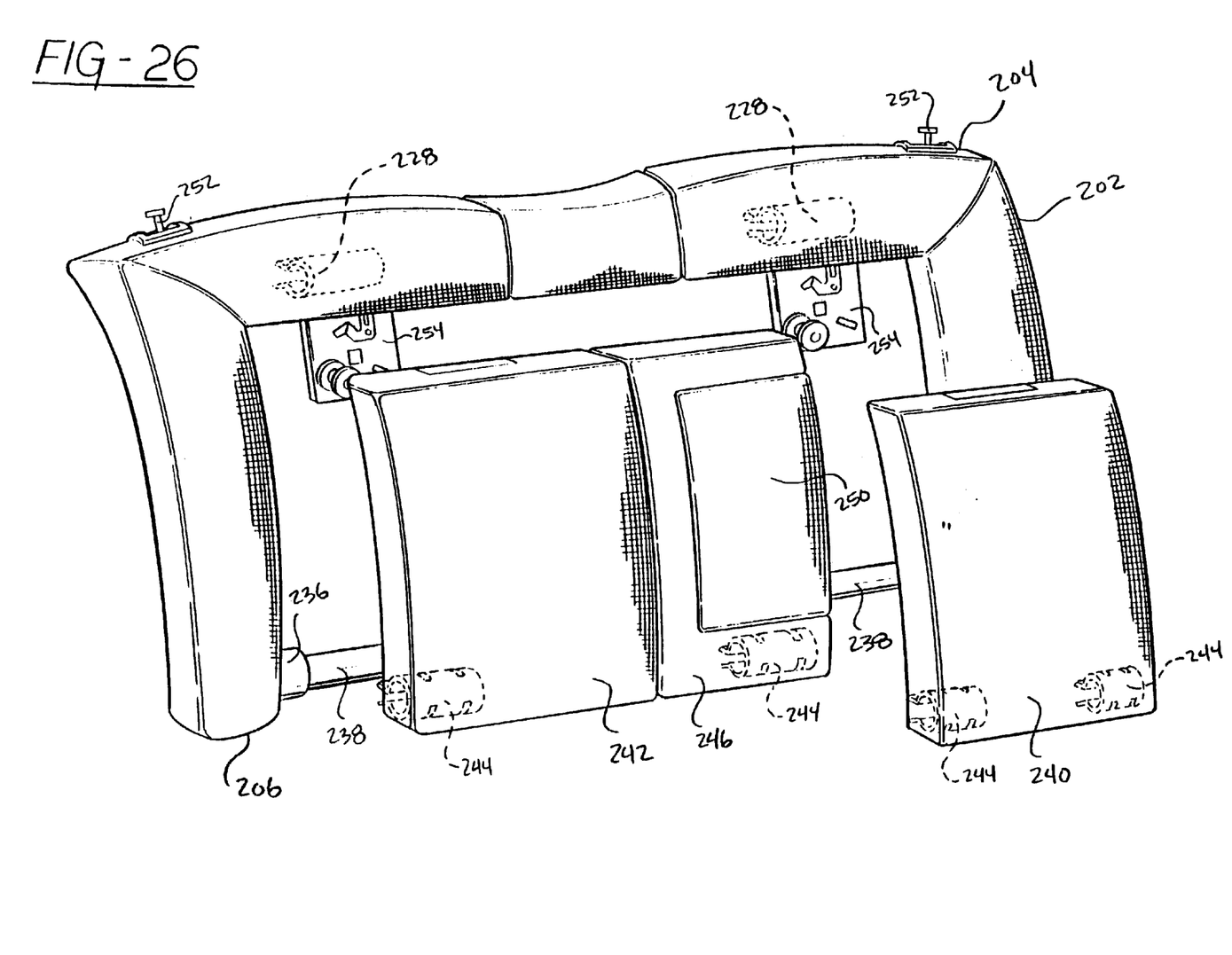
FIG. 26 is a perspective view of the seat back incorporating the seating surfaces.

As best shown in FIGS. 25, 26, and 27, the seat back 202 includes a back frame 222 and cushioning material 224 supported by the back frame 222. The cushioning material 224 may be covered by a fabric and/or leather trim cover material 226. The rotational connection 216 interconnects the back frame 222 and the tray 208. The rotational connection 216 comprises a clip 228 and a cylindrical section 230 rotatably disposed in the clip 228. In the preferred embodiment, the clip 228 is secured to the back frame 222 and the cylindrical section 230 is secured to the first appendage 212 of the tray 208. As shown in the Figures, there are two sets of clips 228 and cylindrical sections 230. As appreciated by those skilled in the art, there may be any number of clips 228 and corresponding cylindrical sections 230 so long as the package tray 208 can be adequately supported onto the top 204 of the seat back 202. As also appreciated by those skilled in the art, the rotational connection 216 may be of any suitable design.

As best shown in FIGS. 25 and 26, the back frame 222 comprises a top portion 232 and two substantially parallel side portions 234 extending from the top portion 232 which create a substantially U-shaped back frame 222. The clips 228 are secured along the top portion 232 of the back frame 222. The side portions 234 each include a snap 236 for securing the back frame 222 to a support beam 238. In the preferred embodiment, the support beam 238 is a hollow steal tube, however, the support beam 238 may be of any suitable design without deviating from the scope of the subject invention. The back frame 222 also includes right 240 and left 242 seating surfaces each having a pair of snaps 244. The right 240 and left 242 seating surfaces are pivotally retained to the support beam 238 between the side portions 234 and below the top portion 232 of the back frame 222. The left seating surface 242 also includes a center portion 246 positioned between the right 240 and left 242 seating surfaces. As shown in FIG. 22, a number of seat belt restraints 248 are also secured to the support beam 238.

When in the upward position, the right 240 and left 242 seating surfaces, the center portion 246, and the back frame 222 form one unitary front surface of the seat back 202. The right 240 and left 242 seating surfaces may be contoured into any number of shapes, sizes or configurations to accommodate various vehicle models. An armrest 250 may be pivotally disposed within the center portion 246 of the left seating surface 242 for selective use by the occupant. In addition, other accessories may be added to the seat back 202, i.e., an integral child seat, a pair of side impact air bags, integral storage compartments, headrests, etc. The occupant may pivot the right 240 and left 242 seating surfaces downward toward a seat bottom (not shown) to extend the floor of a trunk (not shown). Each of the right 240 and left 242 seating surfaces includes a manual lever 252 for actuating a lock/release assembly 254 mounted on the back frame 222. These types of devices for retaining and releasing pivotal seating surfaces are well known in the art.

Figure 23:
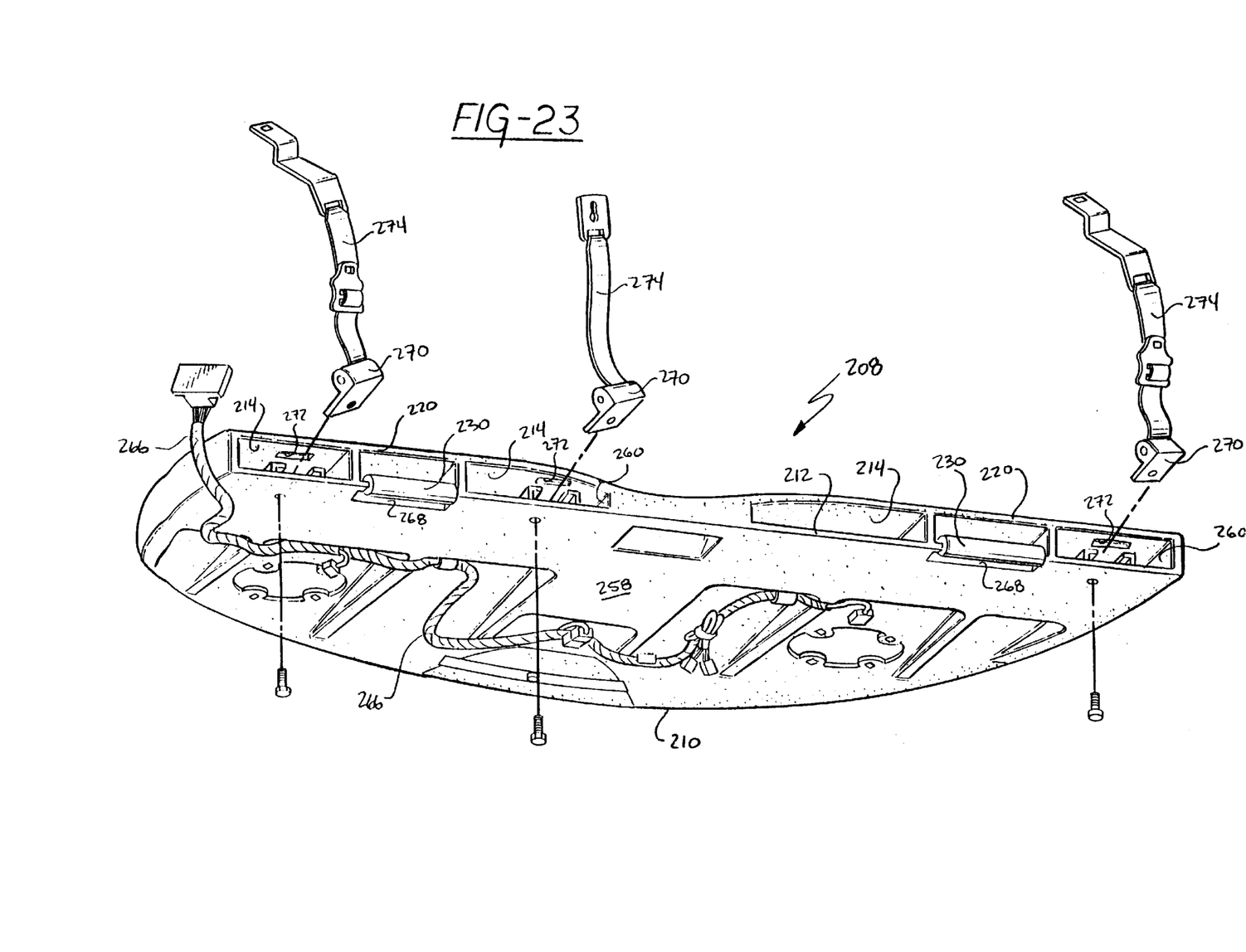
FIG. 23 is a perspective view of a bottom surface of a package tray as shown in FIG. 22.
Figure 24:
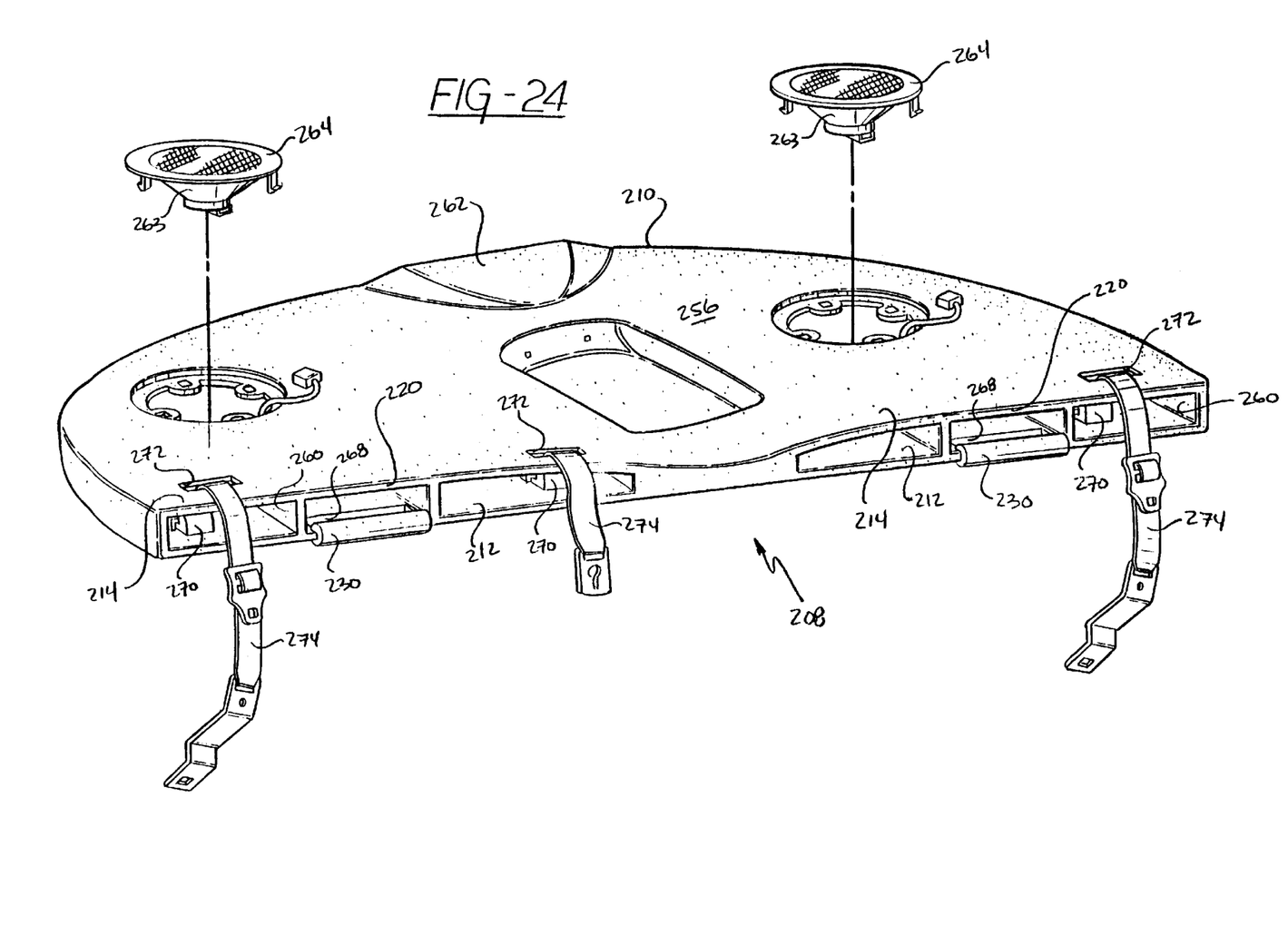
FIG. 24 is a perspective view of a top surface of the package tray.

Referring also to FIGS. 23 and 24, the package tray 208 includes a top surface 256 and a bottom surface 258 defining at least one cavity 260 between the top 256 and bottom 258 surfaces. A fabric cover (not shown) may extend over the top surface 256 of the tray 208 to improve the aesthetics of the tray 208. In addition, the top surface 256 may house a rear tail light 262, a number of speakers 263 and speaker grills 264, a first aid kit (not shown), or any other appropriate device. Likewise, the bottom surface 258 may house or retain electrical connections 266 or any other suitable devices.

As best shown in FIG. 27, the preferred embodiment shows the first appendage 212 forming at least a portion of the bottom surface 258 of the tray 208 and the second appendage 214 forming at least a portion of the top surface 256 of the tray 208. Hence, the rotational connection 216 is mounted to the bottom surface 258 of the tray 208 and the tab 220 is mounted to the top surface 256 of the tray 208. As discussed above, the cylindrical section 230 of the rotational connection 216 is mounted to the tray 208. A channel 268 is cut out of the bottom surface 258 directly behind the cylindrical section 230 to allow for the pivotal movement of the tray 208. More specifically, the clip 228, which partially surrounds the cylindrical section 230, passes in and out of the channel 268 as the tray 208 pivots between the first and second positions. As appreciated by those skilled in the art, the rotational connection 216 could be part of the top surface 256 or located between the top 256 and bottom 258 surfaces. Likewise, the tab 220 could be part of the bottom surface 258 or located between the top 256 and bottom 258 surfaces.

At least one seat belt retractor 270 is mounted to the first appendage 212 within the cavity 260 of the tray 208. At least one slot 272 is disposed within the second appendage 214. In the preferred embodiment, the seat belt retractor 270 is mounted to the bottom surface 258 of the tray 208 and the slot 272 is disposed in the top surface 256 of the tray 208. A seat belt 274 is coiled within the retractor 270 and extends outwardly through the slot 272 in the second appendage 214. In the preferred embodiment, there are three seat belt retractors 270 along with three corresponding slots 272 for allowing three seat belts 274 to extend therethrough. As appreciated by those skilled in the art, there may be any number of retractors 270, slots 272, and seat belts 274 as are deemed necessary. The seat belts 274 extend along the front surface of the seat back 202 and can lock into the seat belt restraints 248 when needed to secure an occupant to the seat back 202. Because the package tray 208 is locked to the seat back 202 and has become a structural component of the seat back 202, load bearing devices, such as the retractors 270, can be mounted directly to the package tray 208.

Figure 28:
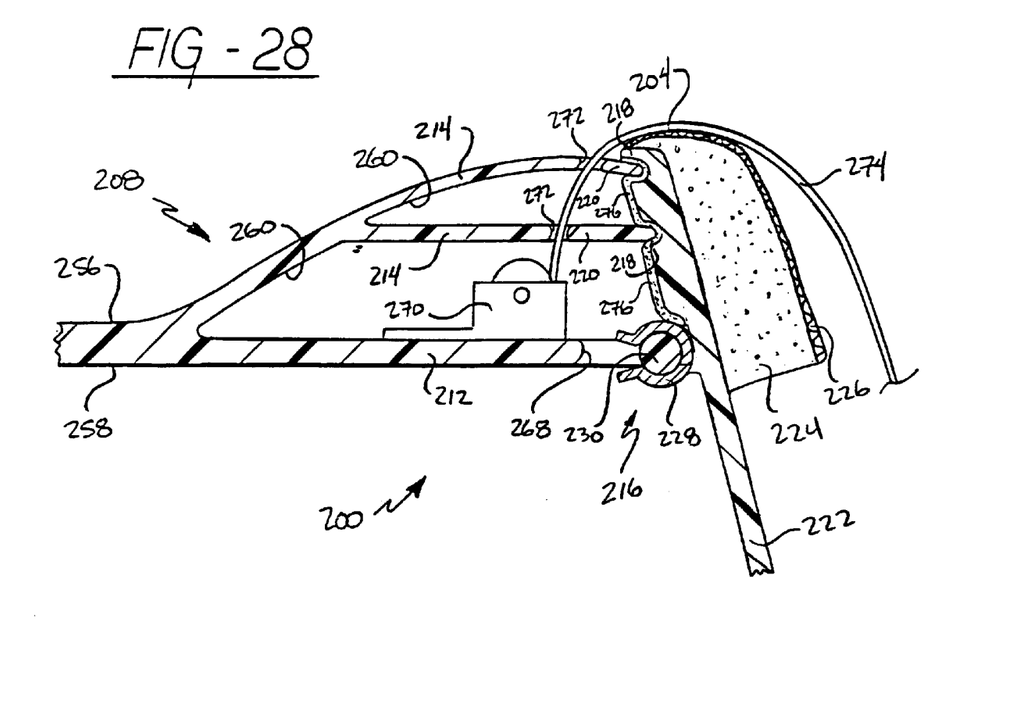
FIG. 28 is a cross-sectional view of an alternative embodiment of the subject invention.

Referring to FIG. 28, an alternative embodiment of the subject invention is shown. Specifically, the seat back 202 has two receptacles 218 and the second appendage 214 has two projecting tabs 220 for respective interlocking engagement with the two receptacles 218. Hence, two cavities 260 are now formed between the top 256 and bottom 258 surfaces of the package tray 208. As appreciated by those skilled in the art, any number of second appendages 214 and corresponding tabs 220 may be used without deviating from the scope of the subject invention. The first appendage 212 forms at least a portion of the bottom surface 258 of the tray 208 and one of the second appendages 214 forms at least a portion of the top surface 256 of the tray 208. Hence, the rotational connection 216 forms part of the bottom surface 256 and one of the tabs 220 forms part of the top surface 256. The other tab 220 is disposed between the top 256 and bottom 258 surfaces. A retaining material 276 is disposed between the receptacles 218 and the tabs 220 to assist in securing the tabs 220 to the receptacles 218. The retaining material 276 may be of any suitable composition so long as the frictional forces between the tabs 220 and the receptacles 218 is adequately maintained. The retaining material 276 could also act as a wedge between the tabs 220 and the receptacles 218.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. An automotive rear seat assembly, comprising:
a seat back having a top and a bottom,
a package tray extending from said top of said seat back to an outer periphery,
a rotational connection rotatably interconnecting said package tray with said top of said seat back, said package tray may be rotated relative to said seat back from a first position substantially overlying said seat back to a second position transverse to said seat back,
said top of said seat back having at least one receptacle and said package tray having at least one projecting tab, said projecting tab engages said receptacle to mechanically interlock said package tray to said top of said seat back when said package tray is in said second position.

2. An assembly as set forth in claim 1, wherein said seat back includes a back frame, said rotational connection interconnecting said back frame and said package tray.

3. An assembly as set forth in claim 1 wherein said package tray includes a top surface and a bottom surface defining at least one cavity between said top and bottom surfaces.

4. An assembly as set forth in claim 1, wherein said package tray includes a top surface and a bottom surface, a first appendage forming at least a portion of said bottom surface of said package tray and a second appendage forming at least a portion of said top surface of said package tray.

5. An assembly as set forth in claim 1, further including at least one seat belt retractor mounted to said package tray.

6. An assembly as set forth in claim 5, further including at least one slot disposed within said package tray, and a seat belt disposed within said at least one seat belt retractor, said seat belt extending outwardly through said at least one slot.

7. An assembly as set forth in claim 1 wherein said rotational connection comprises a clip and a cylindrical section rotatably disposed in said clip.

8. An assembly as set forth in claim 7, wherein said clip is secured to said back frame and said cylindrical section is secured to said package tray.

9. An assembly as set forth in claim 2, wherein said back frame comprises a top portion and two side portions extending downwardly from said top portion.

10. An assembly as set forth in claim 9, wherein a clip is secured along said top portion of said back frame.

11. An assembly as set forth in claim 10, wherein said side portions each include a snap for securing said back frame to a support beam.

12. An assembly as set forth in claim 11, further including right and left seating surfaces each having a pair of snaps, said right and left seating surfaces are pivotally retained to said support beam between said side portions and below said top portion of said back frame.

13. An assembly as set forth in claim 14, further including at least one seat belt restraint secured to said support beam.

14. An assembly as set forth in claim 2, wherein said seat back has two receptacles and said second appendage has two projecting tabs for respective interlocking engagement with said two receptacles.

15. An assembly as set forth in claim 14 further including a retaining material disposed between said receptacles and said tabs to assist in securing said tabs to said receptacles.

16. An automotive rear seat assembly, comprising:
a seat back having a top and a bottom;
a package tray extending from said seat back;
a package tray extending from said seat back;
at least one seat belt retractor mounted to said package tray; and
a rotational connection for rotatably interconnecting said package tray with the top of said seat back such that said package tray is rotatable relative to said seat back from a first position substantially overlying said seat back to a second position transverse to said seat back.

17. An assembly according to claim 16, further including at least one slot formed in said package tray, and further including a seat belt disposed within said at least one seat belt retractor, said seat belt extending outwardly through the at least one slot.

18. An assembly according to claim 16, wherein the top of said seat back includes at least one receptacle and said package tray includes at least one projecting tab, said projecting tab engaging said receptacle to mechanically interlock said package tray to the top of said seat back when said package tray is in the second position.

19. An automotive rear seat assembly, comprising:

a seat back having a top and a bottom and including a back frame, said back frame including a top portion and two side portions extending downwardly from said top portion;

a support beam extending between said two side portions;

at least one seat belt restraint secured to said support beam;

a package tray extending from said seat back; and a rotational connection for rotatably interconnecting said package tray with the top of said seat back such that said package tray is rotatable relative to said seat back from a first position substantially overlying said seat back to a second position transverse to said seat back.

20. An assembly according to claim 19, further including a snap for securing said back frame to said support beam.

21. An assembly according to claim 19, wherein the top of said seat back includes at least one receptacle and said package tray includes at least one projecting tab, said projecting tab engaging said receptacle to mechanically interlock said package tray to the top of said seat back when said package tray is in the second position.

* * * * *